Dec. 25, 1962

L. A. ADDLEMAN 3,070,747

IMAGE REJECTION SYSTEMS

Filed Sept. 2, 1958

INVENTOR

Lloyd A. Addleman

United States Patent Office 3,070,747

Patented Dec. 25, 1962

3,070,747

IMAGE REJECTION SYSTEMS

Lloyd A. Addleman, Los Altos, Calif., assignor to Microwave Engineering Laboratories, Inc., Palo Alto, Calif.

Filed Sept. 2, 1958, Ser. No. 759,377
7 Claims. (Cl. 325—437)

This invention relates to image response rejection for superheterodyne receivers especially those which are required to tune rapidly over a broad range of frequencies.

The object of this invention is to provide a novel system for rejecting all response to the image frequencies without performing the usual preselection function; this function being difficult to perform with rapid tuning.

These and other objects of my invention will either be explained or will become apparent when this specification is studied in conjunction with the accompanying drawings.

Referring to the drawings.

The present invention consists of a superheterodyne mixing system made up of appropriate radio frequency and intermediate frequency networks.

Figure 1:
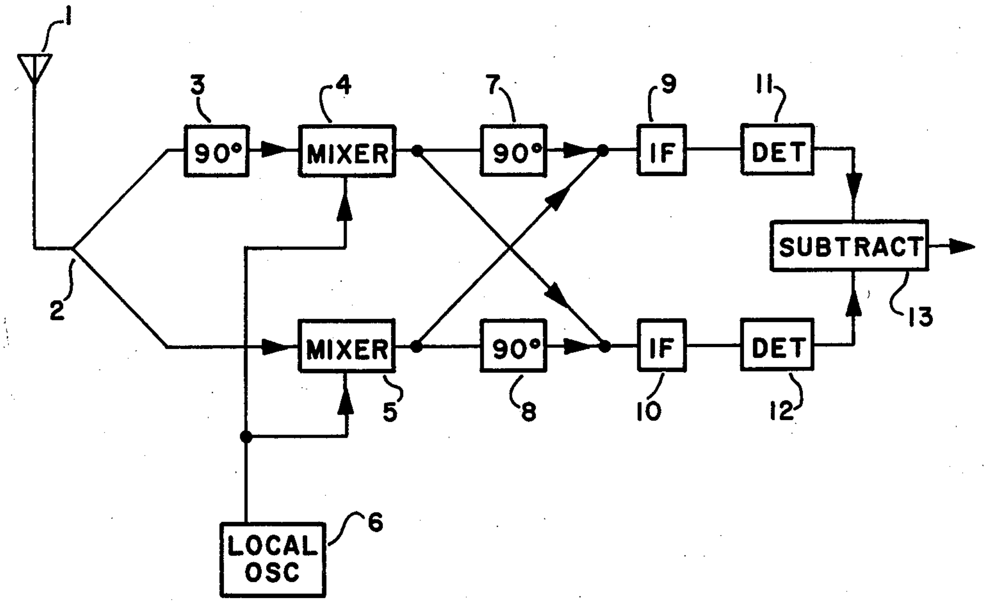
FIGURE 1 shows an image rejection system in accordance with the invention.

Referring to FIGURE 1, the diagram of the general system, signal power enters the receiver from antenna 1 and is divided equally at junction 2. Broadband phase shifter 3 shifts the phase of the signal in one signal arm 90° with respect to the phase of the signal in the other. The signal in each signal arm is then mixed at the mixers 4 and 5 with a local oscillator signal to develop the intermediate frequency. The local oscillator signal is applied from oscillator 6 in phase to both mixers. The two intermediate frequency signal products now are related ±90° out of phase, the sign of which depends upon whether the signal frequency was greater or less than the local oscillator signal frequency.

If one of the intermediate frequency signals is now phase shifted by 90° and combined with the other, the two signals will add for one signal response and cancel for the other.

Mathematically, the process of mixing to give an intermediate signal is multiplication of the input signal and local oscillator signal. The present system can be described as follows:

If the input signal is represented by sin $\omega_S t$, and the local oscillator signal by sin $\omega_{LO} t$, then the mixer outputs are:

Mixer 5:

$$\sin \omega_S t \sin \omega_{LO} t = \tfrac{1}{2} \cos (\omega_S - \omega_{LO}) t - \tfrac{1}{2} \cos (\omega_S + \omega_{LO}) t$$

Mixer 4:

$$\cos \omega_S t \sin \omega_{LO} t = \tfrac{1}{2} \sin (\omega_{LO} - \omega_S) t + \tfrac{1}{2} \sin (\omega_S + \omega_{LO}) t$$

The tuned circuits of the intermediate frequency amplifiers 9 and 10 discard the $(\omega_S + \omega_{LO})t$ signals leaving two component signals to be considered as represented by the $(\omega_S - \omega_{LO})t$ and $(\omega_{LO} - \omega_S)t$ functions above. Since the intermediate frequency is developed from the frequency difference of the local oscillator and the input signals, each of these components will be of the intermediate frequency. One is developed from the desired input signal and the other is developed from the image signal.

Considering the signals as applied to the IF amplifier 10, the following results can be obtained. Assuming that $\omega_S < \omega_{LO}$, then the output of mixer 4 can be expressed as $$\tfrac{1}{2} \sin (\omega_{LO} - \omega_S) t = \tfrac{1}{2} \sin \omega_{IF} t$$

and the output of mixer 5 can be expressed as $$\tfrac{1}{2} \cos (\omega_S - \omega_{LO}) t = \tfrac{1}{2} \cos \omega_{IF} t$$

where $\omega_{IF}$ is the intermediate frequency. The 90° phase shift in the output of the mixer 5 will cause the two inputs at the IF amplifier 10 to be 180° out of phase and cancel. Thus, the input to amplifier 10 is as follows:

$$\tfrac{1}{2} \cos (\omega_{IF} + 90°) t + \tfrac{1}{2} \sin \omega_{IF} t = -\tfrac{1}{2} \sin \omega_{IF} t + \tfrac{1}{2} \sin \omega_{IF} t = 0$$

If, on the other hand, $\omega_S > \omega_{LO}$, then the output of the mixer 4 may be expressed as $$\tfrac{1}{2} \sin (\omega_{LO} - \omega_S) t = -\tfrac{1}{2} \sin \omega_{IF} t$$

and the output of mixer 5 remains as $$\tfrac{1}{2} \cos (\omega_S - \omega_{LO}) t = \tfrac{1}{2} \cos \omega_{IF} t$$

With the 90° phase shift of the mixer 5 output (in the same sense as before) the two signals applied to the amplifier 10 now tend to add. Here the input to amplifier 10 is as follows:

$$\tfrac{1}{2} \cos (\omega_{IF} + 90°) t - \tfrac{1}{2} \sin \omega_{IF} t = -\tfrac{1}{2} \sin \omega_{IF} t - \tfrac{1}{2} \sin \omega_{IF} t = -\sin \omega_{IF} t$$

Thus, the resultant input to the IF amplifier 10 will be the result of cancelled signals when $\omega_S < \omega_{LO}$ and of additive signals when $\omega_S > \omega_{LO}$.

Similarly, the signals as applied to the IF amplifier 9 can be considered. First, assuming that $\omega_S < \omega_{LO}$, the output of mixer 4 will again be ½ sin $\omega_{IF} t$ and the output of mixer 5 will again be ½ cos $\omega_{IF} t$. A 90° phase shift in the output of mixer 4 and application of the shifted signal along with the output of mixer 5 will result in the following input to amplifier 9.

$$\tfrac{1}{2} \cos \omega_{IF} t + \tfrac{1}{2} \sin (\omega_{IF} + 90°) t = \tfrac{1}{2} \cos \omega_{IF} t + \tfrac{1}{2} \cos \omega_{IF} t = \cos \omega_{IF} t$$

Conversely, when $\omega_S > \omega_{LO}$, the input to amplifier 10 is:

$$\tfrac{1}{2} \cos \omega_{IF} t - \tfrac{1}{2} \sin (\omega_{IF} + 90°) t = \tfrac{1}{2} \cos \omega_{IF} t - \tfrac{1}{2} \cos \omega_{IF} t = 0$$

Thus, the resultant input to the amplifier 9 will be the result of cancelled signals when $\omega_S > \omega_{LO}$ and of additive signals when $\omega_S < \omega_{LO}$.

As a result, for signals of frequency higher than the local oscillator, —sin $\omega_{IF} t$ will appear as an input to the amplifier 10. For signals of frequency lower than the local oscillator, cos $\omega_{IF} t$ appears as an input to the amplifier 9. This quadrature of IF inputs to the amplifiers 9 and 10 is of little consequence as will be seen presently and alternatively may be compensated by another 90° phase shift.

After amplification in the IF amplifiers 9 and 10, both signals are detected at 11 and 12 thereby eliminating the IF signals and leaving only a lower frequency information signal. Since the information signal may be considered as being of a much lower frequency than the IF, all phase information is lost and the 90° phase difference at the inputs and outputs of the IF amplifiers 9 and 10 will not cause any defect in the detected signal. The detected signals are then subtracted at 13.

Figure 2:
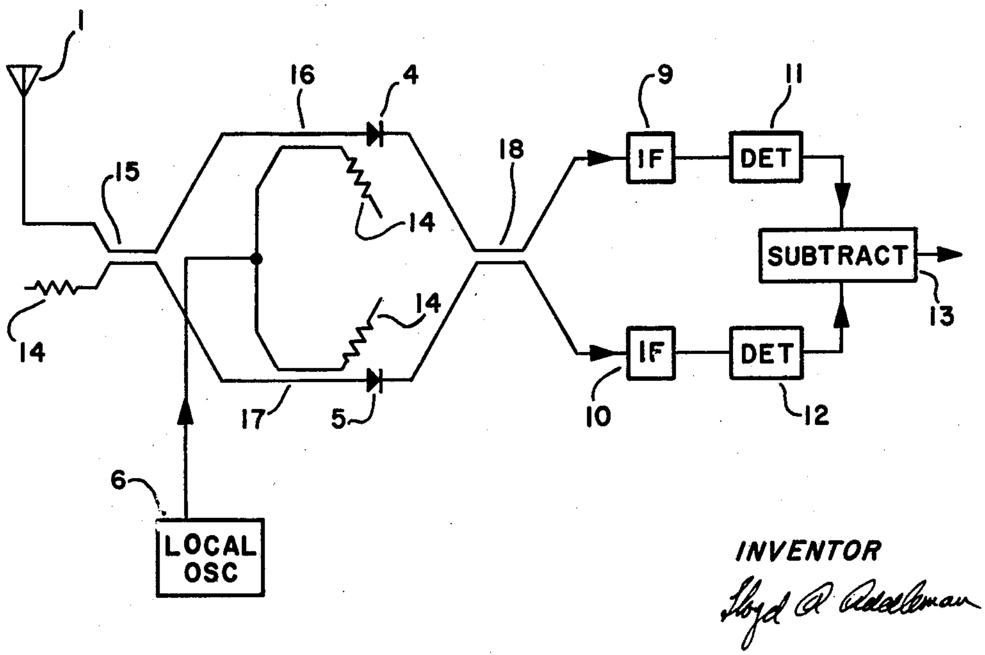
FIGURE 2 shows an embodiment of the invention for microwave frequencies.

A practical embodiment of the system is shown in FIGURE 2 in which like reference numerals refer to like parts of FIGURE 1. Element 15 is a directional coupler of 3 db coupling that can perform the function of both 2 and 3 of FIGURE 1 over a very broad frequency range. Couplers of this type are well known in the art. The energy is divided equally between the two branches. However, the energy coupled out has a 90° phase relationship due to the inherent nature of coupling. Element 15 also serves to isolate any local oscillator signal power that may be reflected from the mixers 4 and 5. Element 14 is a resistive termination for the spare arm of the directional coupler 15. The local oscillator signal power is introduced into each arm by two other directional couplers 16 and 17 of suitably small coupling to avoid loss of signal power into the oscillator.

The function of intermediate frequency phase shifting and addition may be performed in a number of ways. Perhaps the most simple is another 3 db directional coupler. The phase shift for the coupled signal is 90° and they are summed correctly if the coupling is 3 db.

While I have shown and described and pointed out my invention as applied above, it will be apparent to those skilled in the art that many modifications can be made within the scope and sphere of my invention as defined in the claims which follow.

What is claimed is:

1. A receiving system for receiving an input signal and separating image and input signal responses comprising first and second circuit arms, means for applying said signals to each of said circuit arms, means for applying a local signal to each of said circuit arms, means connected in circuit with one of said arms for providing a different phase between the input signal and local signal in one of said circuit arms than in the other, mixing means connected in circuit with each of said circuit arms serving to mix the local signal and the input signal and provide in each of said circuit arms an intermediate frequency signal, means disposed in each of said circuit arms for receiving and shifting the phase of the intermediate frequency signal of the respective arm to give a shifted intermediate frequency signal in each of said arms, means for combining the intermediate frequency signal of each of said circuit arms with the shifted intermediate frequency signal of the other of said circuit arms to provide a resultant signal in each of said circuit arms, and means for subtracting the resultant signals to provide an output signal having opposite polarity for the input signal response and the image response.

2. A receiving system as in claim 1 including detector means connected in circuit with each of said arms to detect the resultant signals.

3. A receiving system as in claim 2 wherein said means connected in circuit with one of said arms for providing a different input signal to local signal phase in one of said arms introduces a substantially 90° phase shift, and wherein said means for shifting the phase of the intermediate frequency in each of said circuit arms introduces a substantially 90° phase shift.

4. A receiving system as in claim 1 wherein said receiver serves to receive microwave signals and wherein said means connected in circuit with one of said circuit arms providing a different phase between the input signal and the local signal in one of said circuit arms than in the other comprises a directional coupler disposed to receive the input signal and provide output signals to said first and second circuit arms.

5. A receiving system as in claim 1 wherein said receiver serves to receive microwave signals and wherein said means for shifting the phase of the intermediate frequency in the respective circuit arms to give a shifted intermediate frequency and said means for combining the intermediate frequency signal in each circuit arm with the shifted intermediate frequency of each of the other circuit arms comprises a directional coupler.

6. A receiving system as in claim 1 wherein said receiver serves to receive microwave signals and wherein said means connected in circuit with one of said arms providing a different phase between the input signal and the local signal in one of said circuit arms than in the other comprises a directional coupler disposed to receive the input signal and provide output signals to said first and second circuit arms, and wherein said means for shifting the phase of the intermediate frequency in the respective circuit arms to give a shifted intermediate frequency and said means for combining the intermediate frequency signal in each circuit arm with the shifted intermediate frequency of the other circuit arm comprises a directional coupler.

7. A receiving system as in claim 2 wherein an intermediate frequency amplifier is provided between the phase shifting means and the detectors for amplifying the resultant signals in each of said circuit arms.

References Cited in the file of this patent

UNITED STATES PATENTS

| | | |
|---|---|---|
| 2,044,745 | Hansell | June 16, 1936 |
| 2,279,177 | Plebanski | Apr. 7, 1942 |
| 2,772,350 | Deardorff | Nov. 27, 1956 |
| 2,964,622 | Fire | Dec. 13, 1960 |